(No Model.)

A. A. ABBOTT.
TWO WHEELED VEHICLE.

No. 260,631. Patented July 4, 1882.

Witnesses,
Henry Frankfurter,
J. B. Halpenny

Inventor,
Arthur A. Abbott.
Gridley & Co.,
per his Attorneys,

United States Patent Office.

ARTHUR A. ABBOTT, OF CHICAGO, ILLINOIS.

TWO-WHEELED VEHICLE.

SPECIFICATION forming part of Letters Patent No. 260,631, dated July 4, 1882.

Application filed May 8, 1882. (No model.)

*To all whom it may concern:*

Be it known that I, ARTHUR A. ABBOTT, of Chicago, in the county of Cook and State of Illinois, have invented certain new and useful Improvements in Two-Wheeled Carts, of which the following, in connection with the accompanying drawings, is a specification.

Figure 1:
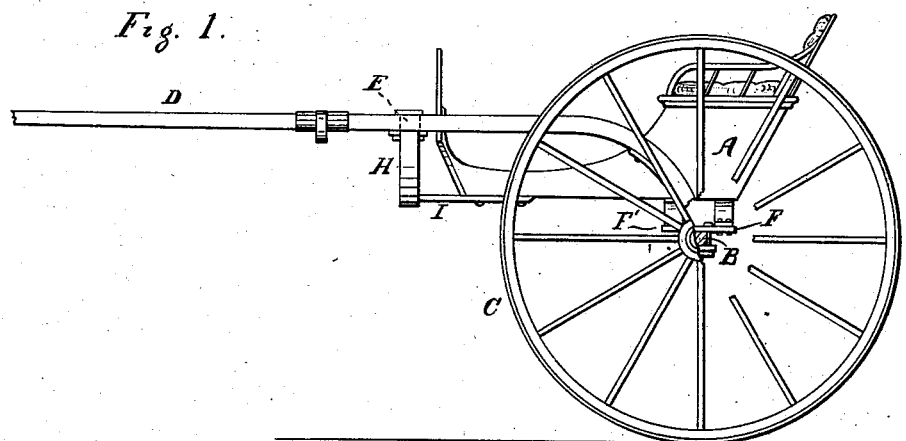
Figure 2:
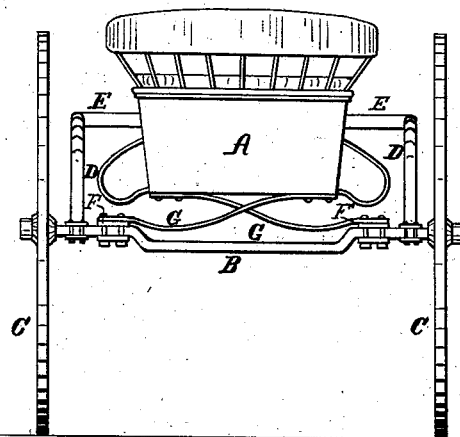
Figure 3:
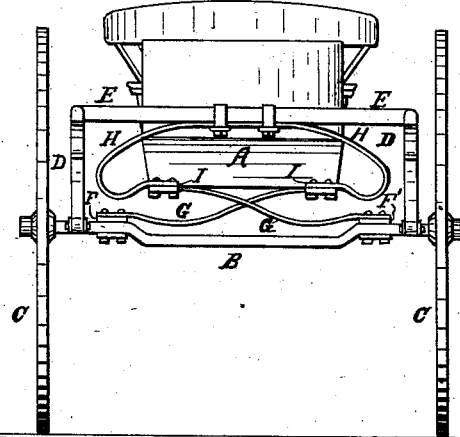

In the drawings, Figure 1 is a side view of a two-wheeled vehicle embodying my invention. Fig. 2 is a rear view thereof, and Fig. 3 is a front view of the same.

Like letters of reference indicate like parts.

My purpose is to so construct a two-wheeled cart that it will be very light and have its body very low to prevent tipping, and to provide it with springs, which will aid in accomplishing these desirable results, and also render the vehicle very easy to ride in.

A represents the body of the cart. B is the axle, and C C are the wheels. D D are the shafts, and E is a cross-bar connecting them. The shafts are connected at their rear ends to the axle by means of clips, or in any well-known or suitable way.

F is a small plate rigidly attached to the axle near one of the wheels, and F' is a like plate, also rigidly attached to the axle, but located near the other wheel. The plate F extends rearward from the axle a short way, and the plate F' extends a short way in front thereof.

G and G' are the rear springs. These springs are attached at one end to the rear corners of the box or body A, respectively, and at the other ends to the plates F and F', respectively, one spring being in advance of the other, or so that they will not interfere with each other when the cart is in use. These springs extend laterally in opposite directions, from the box-corners to which they are applied and cross each other, as shown. Their form is such as to render them flexible, and they also support the body with sufficient firmness, but not stiffly.

H is the front spring. This spring is bow-shaped. It bows upward, and its ends are bent or bowed inward, as shown. Its central portion is attached to the central part of the cross-bar E by means of clips or otherwise, and I I are arms extending from the forward corners of the box or body A, and to these arms the ends of the spring H are secured.

The body, as will be perceived, is hung low, and while capable of yielding sufficiently to render the vehicle easy to ride in the box is also held with sufficient firmness to prevent it from striking the axle and from being swayed or swung laterally.

The springs are light, simple in their construction, and may be applied with facility.

Having thus described my invention, what I claim as new, and desire to secure by Letters Patent, is—

The combination of the box A, axle B, cross-springs G G', spring H, and cross-bar E, substantially as shown and described, and for the purposes set forth.

ARTHUR A. ABBOTT.

Witnesses:
N. COWLES,
J. S. THOMPSON.